(12) United States Patent
Shah et al.

(10) Patent No.: US 7,871,457 B2
(45) Date of Patent: Jan. 18, 2011

(54) CARBON DIOXIDE PRODUCTION METHOD

(75) Inventors: Minish Mahendra Shah, East Amherst, NY (US); Ravi Kumar, Williamsville, NY (US); Henry Edward Howard, Grand Island, NY (US); Bernard Thomas Neu, Lancaster, NY (US); Dante Patrick Bonaquist, Grand Island, NY (US); John Fredric Billingham, Getzville, NY (US)

(73) Assignee: Praxair Technology, Inc., Danbury, CT (US)

( * ) Notice: Subject to any disclaimer, the term of this patent is extended or adjusted under 35 U.S.C. 154(b) by 743 days.

(21) Appl. No.: 11/395,137

(22) Filed: Apr. 3, 2006

(65) Prior Publication Data

US 2007/0232706 A1    Oct. 4, 2007

(51) Int. Cl.
B01D 53/02 (2006.01)

(52) U.S. Cl. .............................. 95/96; 95/102; 95/139; 423/437.1

(58) Field of Classification Search .............. 423/437.1, 423/418.2, 415.1, 414, 644, 648.1, 650, 651; 95/96, 101, 102, 139
See application file for complete search history.

(56) References Cited

U.S. PATENT DOCUMENTS

| | | | |
|---|---|---|---|
| 4,952,223 A * | 8/1990 | Kirshnamurthy et al. ...... 62/626 |
| 4,963,339 A * | 10/1990 | Krishnamurthy et al. .. 423/437.2 |
| 5,000,925 A | 3/1991 | Krishnamurthy et al. .... 422/189 |
| 5,538,706 A * | 7/1996 | Kapoor et al. ........... 423/418.2 |
| 6,090,312 A * | 7/2000 | Ziaka et al. ................. 252/373 |
| 6,224,843 B1 * | 5/2001 | Ahmed et al. ............ 423/437.1 |
| 6,425,938 B1 * | 7/2002 | Xu et al. ....................... 95/100 |
| 6,497,852 B2 * | 12/2002 | Chakravarti et al. ......... 423/228 |
| 6,500,241 B2 | 12/2002 | Reddy .......................... 96/134 |
| 6,551,380 B1 | 4/2003 | Reddy et al. ................... 95/41 |
| 2002/0073845 A1 | 6/2002 | Reddy | |

FOREIGN PATENT DOCUMENTS

| FR | 2872890 | 1/2006 |
|---|---|---|
| WO | WO 99/35455 | 7/1999 |

* cited by examiner

*Primary Examiner*—Robert A Hopkins
(74) *Attorney, Agent, or Firm*—David M. Rosenblum

(57) ABSTRACT

A method of producing a carbon dioxide product stream from a synthesis gas stream formed within a hydrogen plant having a synthesis gas reactor, a water-gas shift reactor, located downstream of the synthesis gas reactor to form the synthesis gas stream and a hydrogen pressure swing adsorption unit to produce a hydrogen product recovered from the synthesis gas stream. In accordance with the method the carbon dioxide from the synthesis gas stream by separating the carbon dioxide from the synthesis gas stream in a vacuum pressure swing adsorption system, thereby to produce a hydrogen-rich synthesis gas stream and a crude carbon dioxide stream and then purifying the crude carbon dioxide stream by a sub-ambient temperature distillation process thereby to produce the carbon dioxide product. A hydrogen synthesis gas feed stream to the hydrogen pressure swing adsorption unit is formed at least in part from the hydrogen rich stream.

11 Claims, 12 Drawing Sheets

CO₂ VPSA - 6 Beds, 3 Pressure Equalizations and Direct Mixing

|   | Feed | DP1 | DP2 | DP3 | DPf | Evacuation | PE3 | PE2 | PE1 | FeRP |
|---|---|---|---|---|---|---|---|---|---|---|
| 1 |  | FeRP | Feed | | | | DP3 | Evacuation | PE3 | PE2 |
| 2 | PE1 | | | DP1 | DP2 | DPf | DP1 | | | |
| 3 | PE3 | PE2 | FeRP | PE1 | Feed | | | DP2 | DP3 | Evacuation |
| 4 | Evacuation | PE3 | PE2 | | FeRP | | | DPf | DP1 | DP2 |
| 5 | DP3 | DPf | Evacuation | PE1 | PE2 | | Feed | FeRP | PE1 | DP2 |
| 6 | DP1 | DP2 | DP3 | | | Evacuation | PE1 | PE2 | FeRP | Feed |

Feed to CO₂ VPSA ⟶ Product as feed to H₂ PSA
CoC DP1 to PE1 with a bed
CoC DP2 to PE2 with another bed
CoC DP3 to PE3 with another bed
Final CcC DP to provide part of the CO₂ product to be mixed with the evacuated gas
CcC Evac to collect CO₂ product
CCC PE3 with a bed on DP3 to increase H₂/CO₂ recovery
CCC PE2 with a bed on DP2 to increase H₂/CO₂ recovery
CCC PE1 with a bed on DP1 to increase H₂/CO₂ recovery
CcC RP by Feed Effluent

| | Pressure, psia | |
|---|---|---|
| | Start | End |
| Feed | 375 | 375 |
| DP1 | 375 | 282 |
| DP2 | 282 | 190 |
| DP3 | 190 | 96.75 |
| DPf | 97 | 15 |
| Evac. | 15 | 4 |
| PE3 | 4 | 97 |
| PE2 | 97 | 190 |
| PE1 | 190 | 282 |
| FeRP | 282 | 375 |

FIG. 2

Valve Sequence
CO₂ VPSA – 6 Beds, 3 Pressure Equalizations and Direct Mixing

| Step # | Time, sec From | To | Duration | BED A1 | BED A2 | BED A3 | BED A4 | BED A5 | BED A6 |
|---|---|---|---|---|---|---|---|---|---|
| 1 | 0 | 45 | 45 | Feed | PE1 | PE3 | Evac. | DP3 | DP1 |
| 2 | 45 | 90 | 45 | Feed | FeRP | PE2 | Evac. | BD | DP2 |
| 3 | 90 | 135 | 45 | DP1 | Feed | PE1 | PE3 | Evac. | DP3 |
| 4 | 135 | 180 | 45 | DP2 | Feed | FeRP | PE2 | Evac. | BD |
| 5 | 180 | 225 | 45 | DP3 | DP1 | Feed | PE1 | PE3 | Evac. |
| 6 | 225 | 270 | 45 | BD | DP2 | Feed | FeRP | PE2 | Evac. |
| 7 | 270 | 315 | 45 | Evac. | DP3 | DP1 | Feed | PE1 | PE3 |
| 8 | 315 | 360 | 45 | Evac. | BD | DP2 | Feed | FeRP | PE2 |
| 9 | 360 | 405 | 45 | PE3 | Evac. | DP3 | DP1 | Feed | PE1 |
| 10 | 405 | 450 | 45 | PE2 | Evac. | BD | DP2 | Feed | FeRP |
| 11 | 450 | 495 | 45 | PE1 | PE3 | Evac. | DP3 | DP1 | Feed |
| 12 | 495 | 540 | 45 | FeRP | PE2 | Evac. | BD | DP2 | Feed |

"Blank" Valve Closed
o Valve fully open
⊕ Valve with Positioner

FIG. 4

CARBON DIOXIDE PRODUCTION METHOD

FIELD OF THE INVENTION

The present invention relates to a method of producing a carbon dioxide product stream from a synthesis gas stream formed within a hydrogen plant having a synthesis gas reactor, a water-gas shift reactor to form the synthesis gas stream and a hydrogen pressure swing adsorption unit to form a hydrogen product. More particularly, the present invention relates to such a method in which the carbon dioxide is recovered from the synthesis gas stream by successively separating the carbon dioxide from the synthesis gas stream by a vacuum pressure swing adsorption process and a sub-ambient temperature distillation process. Even more particularly, the present invention relates to such a method having application to use of the carbon dioxide product stream for enhanced oil recovery or for sequestration.

BACKGROUND OF THE INVENTION

Synthesis gas contains carbon monoxide and hydrogen that can be further purified to produce hydrogen and carbon monoxide products or can be further reacted in such downstream chemical processes that, for example, involve the production of methanol or known gas to liquid processes for synthetic fuels by means of the Fischer-Thropsch process.

Synthesis gas is generated within a steam methane reformer by introducing a hydrocarbon containing feed, typically natural gas, into steam methane reformer tubes located in a radiant section of the steam methane reformer. The reformer tubes are packed with a catalyst that is used to promote the steam methane reforming reactions. Steam methane forming reactions are endothermic and hence, heat is supplied to the reformer tubes to support the reactions by burners firing into the radiant section of the steam methane reformer. Synthesis gas can also be generated in a partial oxidation reactor by reaction between hydrocarbon and oxidant (e.g. oxygen) or in an autothermal reformer by reaction between hydrocarbon, oxidant and steam.

After a synthesis gas stream has been cooled, the steam and carbon monoxide content of the synthesis gas can be further reacted in a water-gas shift reactor to increase the hydrogen content of the synthesis gas.

An integrated steam generation system is located within the synthesis gas plant to produce the steam for the steam methane reforming reaction, for the water-gas shift reaction and also, for export. The exported steam can itself constitute a valuable product that can affect the economic viability of the hydrogen plant. Steam methane reformers typically have convective heat exchange sections that are connected to the radiant sections. The heated flue gases produced by the burners firing into the radiant section are passed through the convection section to raise steam and to superheat steam for the purposes outlined above. The steam generation system also utilizes heat exchangers both upstream and downstream of the water-gas shift reactor. In this regard, the synthesis gas stream generated in the steam methane reformer must be reduced in temperature to a level suitable for the water-gas shift reactor and consequently, a heat exchanger located upstream of the water-gas shift reactor both cools the synthesis gas stream and raises some of the steam. Since the water-gas shift reaction is an exothermic process, the heat contained in the shifted stream is commonly utilized in heat exchangers located downstream of the water-gas shift reactor for the production of additional steam. All of such steam is routed to a steam header and then superheated in the convective section of the steam methane reformer.

The synthesis gas produced by the steam methane reforming reactions has a carbon dioxide content. After the water-gas shift reactor, the carbon dioxide content of the synthesis gas is further increased as a result of the reaction of the steam with the carbon monoxide. Separation of the carbon dioxide from the synthesis gas is often necessary for downstream processing of the synthesis gas, for example, in methanol production. Additionally, carbon dioxide itself is a valuable product. For example, enhanced oil recovery processes utilize carbon dioxide that is injected down hole in an injection well to drive oil to producing wells. In an enhanced oil recovery process, injection of carbon dioxide in the oil reservoir lowers the viscosity of oil, which allows oil to flow more easily and oil recovery from the reservoir is increased. It is to be noted, however, that when carbon dioxide is used for such purposes it has to be very pure and consequently, is not readily obtained from steam methane reforming plants. Additionally, carbon dioxide emissions from the use of hydrocarbons has been linked to global warming. To address this problem, it has been proposed that carbon dioxide be captured from the industrial sources and injected underground in brine aquifers or in deep oceans for permanent capture of carbon dioxide and thus stabilize atmospheric carbon dioxide levels.

Various carbon dioxide removal systems have, however, been integrated with steam methane reforming facilities in order to at the very least separate the carbon dioxide from the synthesis gas but also, to recover the carbon dioxide for sequestration purposes or for use as a value added product.

U.S. Pat. No. 5,000,925 describes a process to recover hydrogen and carbon dioxide from a hydrogen plant employing a steam methane reformer. In the process, a synthesis gas stream produced from the water-gas shift reactor is introduced into a hydrogen pressure swing adsorption unit to generate a product hydrogen stream and a tail gas stream. The tail gas is compressed and then separated using a carbon dioxide pressure swing adsorption unit to produce a hydrogen-rich stream and a carbon dioxide-rich stream. The carbon dioxide-rich stream is compressed and further purified in a cryogenic unit to produce liquid carbon dioxide. The hydrogen-rich stream is recycled back to the steam methane reformer.

U.S. Pat. No. 6,551,380 discloses a process in which a synthesis gas stream produced by a water-gas shift reactor within a hydrogen plant is conventionally introduced into a hydrogen pressure swing adsorption unit to recover hydrogen and thereby to produce a tail gas stream. The tail gas stream is compressed and then processed in an adsorption unit to recover the carbon dioxide. The carbon dioxide from adsorption unit is sent to the liquefier to produce a purified liquid carbon dioxide product and off-gas from the adsorption unit is sent to a second hydrogen pressure swing adsorption unit to produce hydrogen.

A problem in practically utilizing either of the processes set forth in the patents listed above arises from the common use of the tail gas stream as part of the fuel to the steam methane reformer. Any interruption in the fuel will cause the steam methane reformer system to go off-line resulting in a costly restart in which the primary fuel to the steam methane reformer, typically natural gas, must be utilized to bring the reformer back up to its operational temperature. Another problem in utilizing tail gas is that it must be compressed before a crude carbon dioxide stream can be separated in a vacuum pressure swing adsorption process. The compression step results in additional energy and capital costs.

As will be discussed, the present invention does not extract the carbon dioxide from the tail gas to thereby avoid the problem discussed above. Moreover, the present invention by virtue of the location of recovery of the carbon dioxide within the hydrogen plant has further advantages over the prior art.

SUMMARY OF THE INVENTION

The present invention provides a method of producing a carbon dioxide product stream from a hydrogen plant. The hydrogen plant incorporates a synthesis gas reactor, a water-gas shift reactor located downstream of the synthesis gas reactor and a hydrogen pressure swing adsorption unit to produce a hydrogen product.

In accordance with the method, carbon dioxide is recovered from at least part of a synthesis gas stream produced by the water-gas shift reactor by separating the carbon dioxide from the at least part of the synthesis gas stream in a vacuum pressure swing adsorption process. This separation produces a hydrogen-rich synthesis gas stream and a crude carbon dioxide stream. The crude carbon dioxide stream is purified by a sub-ambient temperature distillation process thereby to produce the carbon dioxide product as a vapor. A hydrogen synthesis gas feed stream is formed at least in part from the hydrogen-rich stream and is introduced into the hydrogen pressure swing adsorption unit, thereby to produce the hydrogen product.

As is evident from the description given above, the carbon dioxide is taken from the synthesis gas stream rather than the tail gas stream. Moreover, since carbon dioxide is removed prior to the hydrogen pressure swing adsorption process, the recovery of hydrogen will advantageously be improved.

Preferably, the sub-ambient temperature distillation process includes compressing and drying the crude carbon dioxide stream. The crude carbon dioxide stream is then cooled to the sub-ambient temperature and stripped within a stripping column to produce a liquid carbon dioxide product from a liquid column bottoms and a tower overhead. A liquid carbon dioxide product stream is expanded at least at one pressure to produce refrigeration and then vaporized to produce at least one carbon dioxide product stream as the carbon dioxide product.

The crude carbon dioxide stream can be dried in a drying unit having an adsorbent subjected to a temperature swing adsorption process wherein moisture is desorbed from the adsorbent with the use of a heated regeneration gas stream. The sub-ambient distillation process can also include further refining a column overhead stream composed of the column overhead to produce a carbon dioxide-rich vapor stream and a carbon dioxide-depleted vapor stream. The carbon dioxide-rich vapor stream is used as the regeneration gas stream and is thereafter recycled back to a compressor used in compressing the crude carbon dioxide stream. The carbon dioxide-depleted vapor stream is recycled back to and fed, along with the synthesis gas stream, to the vacuum pressure swing adsorption process. A less preferable alternative is to combine the carbon dioxide-depleted vapor stream with the hydrogen-rich synthesis gas stream to form the hydrogen synthesis gas feed stream. As will be discussed, a dryer unit does not have to be used in the manner outlined above. In such case, the carbon dioxide-rich vapor stream can still be recycled back to a compressor used in compressing the crude carbon dioxide stream.

In any embodiment, oxygen can be catalytically removed from the crude carbon dioxide stream either before or after the compressor. Oxygen can enter the crude carbon dioxide stream by way of air leakage into the vacuum pressure swing adsorption process.

At least part of the synthesis gas stream, upstream of the vacuum pressure swing adsorption process can be dried in a drying unit having an adsorbent subjected to a temperature swing adsorption process wherein moisture is desorbed from the adsorbent with the use of a heated regeneration gas stream. In such case, the sub-ambient distillation process includes further refining a column overhead stream composed of column overhead to produce a carbon dioxide-rich vapor stream and a carbon dioxide-depleted vapor stream. The carbon dioxide-rich vapor stream is recycled back to a compressor used in compressing the crude carbon dioxide stream and the carbon dioxide-depleted vapor stream is recycled back to and fed, along with the at least part of synthesis gas stream to the vacuum pressure swing adsorption process. The hydrogen-rich stream can be heated and used to form the heated regeneration gas stream. Where the synthesis gas reactor is a steam methane reformer, the further heated regeneration gas stream is made up of a tail gas stream produced by the hydrogen pressure swing adsorption process. Thereafter, the tail gas stream is utilized as part of a fuel for burners located within a radiant heat exchange section of the steam methane reformer. Alternatively, the further heated regeneration gas stream can be made up of the hydrocarbon containing feed stream that is thereafter, reacted within catalyst filled reaction tubes located within a radiant heat exchange section of the steam methane reformer.

In another embodiment of the present invention, moisture can be removed from the at least part of the synthesis gas stream prior to the vacuum pressure swing adsorption process and from the crude synthesis gas stream within the sub-ambient temperature distillation process. Part of the moisture is removed from the at least part of the synthesis gas stream by cooling the at least part of the synthesis gas stream to condense the part of the moisture contained therewithin and removing resultant condensate from the at least part of the synthesis gas stream in a knock-out drum.

In any embodiment of the present invention, the carbon dioxide product can be compressed. Moreover, the synthesis gas stream can have a carbon dioxide content of between about 12 percent and about 25 percent. The crude carbon dioxide stream can have a carbon dioxide content of between about 70 percent and about 98 percent and oxygen content of between 0 and 5000 ppm. The carbon dioxide product can have a purity of between about 98 and 99.9999 percent carbon dioxide and below 100 ppm oxygen. The carbon dioxide product can be compressed to a pressure of between about 1200 psia and about 2500 psia and then introduced into an enhanced oil recovery process or introduced into a carbon dioxide storage site for sequestration.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

FIG. 2 is a schematic illustration of a vacuum pressure swing adsorption process used in connection with the carbon dioxide recovery system utilized in FIG. 1;

FIG. 4 is a valve opening chart of the unit illustrated in FIG. 3;

In order to avoid repetition in the explanation of the accompanying drawings, in the various figures, the same reference numbers were used for elements having a common description within the drawings.

DETAILED DESCRIPTION

Figure 1:
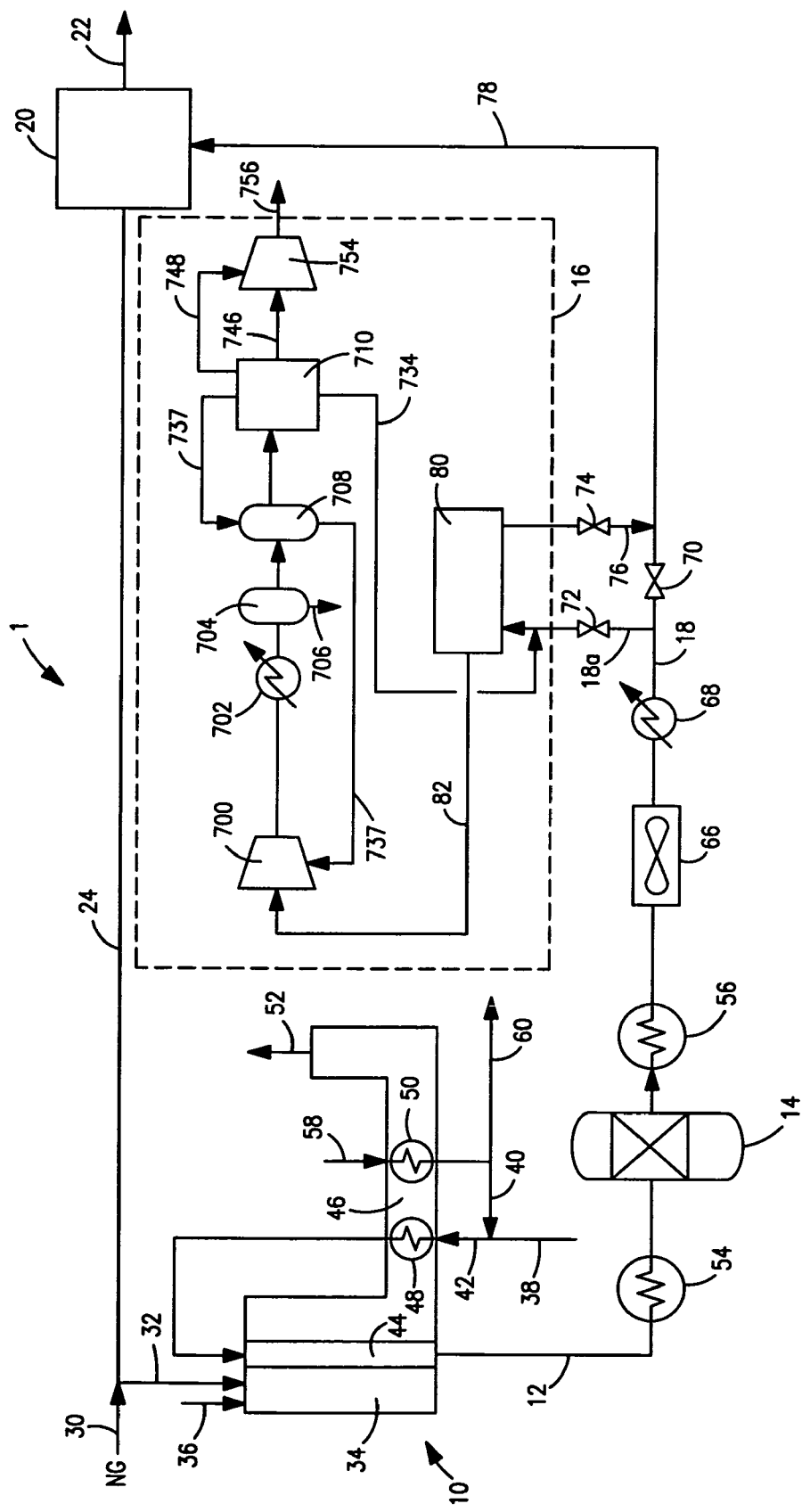
FIG. 1 is a schematic illustration of a process flow diagram of a steam methane reformer and a carbon dioxide recovery system (shown within dashed lines) for carrying out a method in accordance with the present invention.

With reference to FIG. 1 a hydrogen plant 1 is illustrated having a steam methane reformer 10 for generating a crude synthesis gas stream 12, a downstream water-gas shift reactor 14 and a carbon dioxide recovery system 16 for recovering carbon dioxide from a synthesis gas stream 18 in which the hydrogen content has been upwardly shifted by water-gas shift reactor 14.

In hydrogen plant 1, a pressure swing adsorption unit 20 is provided to purify the hydrogen into a hydrogen product stream 22 in a known manner. For example, hydrogen adsorption unit 20 can have adsorbent beds operating out of phase so that while one bed is adsorbing the non-hydrogen components and producing purified hydrogen product as an overhead, another bed is being regenerated at a lower pressure than the bed currently on line to produce the hydrogen product. An example of adsorbents used for such purposes comprise of layers of alumina activated carbon and zeolite compounds. The purification of synthesis gas steam 18 within pressure swing adsorption unit 20 produces a tail gas stream 24 that contains hydrogen, carbon dioxide, carbon monoxide, nitrogen, methane and other hydrocarbons.

Tail gas stream 24 can be combined with a natural gas stream 30 or other hydrocarbon containing fuel to form a fuel stream 32. Fuel stream 32 is introduced into a burner located within a radiant heat exchange section 34 of steam methane reformer 10 along with an oxygen containing stream 36, for instance, air, to support combustion of the fuel stream 32. A hydrocarbon containing stream 38 that can also be natural gas is combined with a superheated steam stream 40 to produce a reactant stream 42 and introduced into reformer tubes such as reformer tube 44 located within radiant section 34 of steam methane reformer 10. In steam methane reformer 10, hydrocarbons react with steam in known steam methane reforming reactions that are endothermic in nature. Heat is supplied to support such steam methane reformers by combustion of fuel stream 32. The flue gases resulting from such combustion pass through a convective section 46 of steam methane reformer 10 having a process gas heat exchanger 48 and a steam superheater 50 that forms part of the steam generation system. The flue gases are discharged as a flue gas stream 52 from a stack as stack gases.

The crude synthesis gas stream 12 is cooled in a process gas boiler 54, that along with steam superheater 50, forms part of the steam generation system. The process gas boiler 54 serves to cool the crude synthesis gas stream 12 to a temperature suitable for the water-gas shift reactions in water-gas shift reactor 14 in which the hydrogen content is upwardly adjusted by reacting the steam content of crude synthesis gas stream 12 with carbon monoxide. The resultant synthesis gas stream 18, also known in the art as the shifted stream, can pass through a feed heater, not illustrated, but that as known in the art is used to heat the hydrocarbon containing feed 38. After having been heated, hydrocarbon containing feed 38 passes through a hydrotreater that converts sulfur species to hydrogen sulphide and then to a zinc-based adsorbent bed to remove the hydrogen sulphide from the feed. The hydrotreater and the adsorbent bed are not illustrated, but are very well known in the art.

The synthesis gas stream 18 passes through a boiling feed water heater 56 that also forms part of the steam generation system. The steam generated in boiling feed water heater 56 and the steam stream raised in process gas boiler 54 are introduced into a steam drum. Steam is extracted from the steam drum as a steam stream 58 and in part forms steam stream 40 used in forming reactant stream 42. Another portion of the superheated steam stream 58 is used in forming an export steam stream 60.

Synthesis gas stream 18 is then passed through a fin-fan cooler 66 and then through a water-cooled cooler 68 before entering pressure swing adsorption system 20. Synthesis gas stream 18 has a pressure of between about 200 psia and about 500 psia, a temperature of between about 60° F. and about 150° F., preferably between about 90° F. and about 110° F. and a composition of between about 60 mol percent and about 80 percent hydrogen, about 12 mol percent and about 25 mol percent carbon dioxide, about 0.1 mol percent and about 5 mol percent carbon monoxide, about 3 mol percent to about 7 mol percent methane, up to about 5 mol percent nitrogen and is saturated with water.

The flow of synthesis gas stream 18 with respect to carbon dioxide removal system 16 is controlled by control valves 70, 72 and 74. When control valves 72 and 74 are in a closed position and control valve 70 is in an open position, a hydrogen synthesis gas feed stream 78 formed entirely of synthesis gas stream 18 passes to pressure swing adsorption unit 20 as aforesaid. When control valve 70 is in a closed position and control valves 72 and 74 are set in open positions, synthesis gas stream 18 passes to carbon dioxide recovery system 16 as stream 18a and then is returned as a hydrogen-rich gas stream 76 that consists of synthesis gas stream 18 having had carbon dioxide removed and thus, a lower carbon dioxide content than synthesis gas stream 18. Hydrogen synthesis gas feed stream 78 is in such case entirely formed of hydrogen-rich gas stream 76 that is routed to pressure swing adsorption system 20 for hydrogen production. As can be appreciated, the setting of control valves 72 and 74 in the closed position allow for maintenance activities to be conducted on the equipment contained within carbon dioxide separation system 16. Partial opening of valves 70 and 72 can allow carbon dioxide recovery from a portion of synthesis gas stream 18 and as such stream 18a consists of a portion of synthesis gas stream 18. The hydrogen-rich gas stream 76 is returned via valve 74 and mixed with the remainder portion of synthesis gas stream 18 to form the hydrogen synthesis gas feed stream 78 that is passed on to the hydrogen pressure swing adsorption unit 20. Due to removal of the carbon dioxide from the synthesis gas stream 18, the load on the hydrogen pressure swing adsorption unit 20 is reduced. It is possible that hydrogen recovery can improve by as much as 0.5 percent.

In order to recover the carbon dioxide within the carbon dioxide recovery unit 16, stream 18a is introduced into a vacuum pressure swing adsorption process conducted in unit 80. This produces hydrogen-rich synthesis gas stream 76 and a crude carbon dioxide stream 82. The crude carbon dioxide stream 82 is further purified in a sub-ambient distillation process to be discussed.

Figure 3:
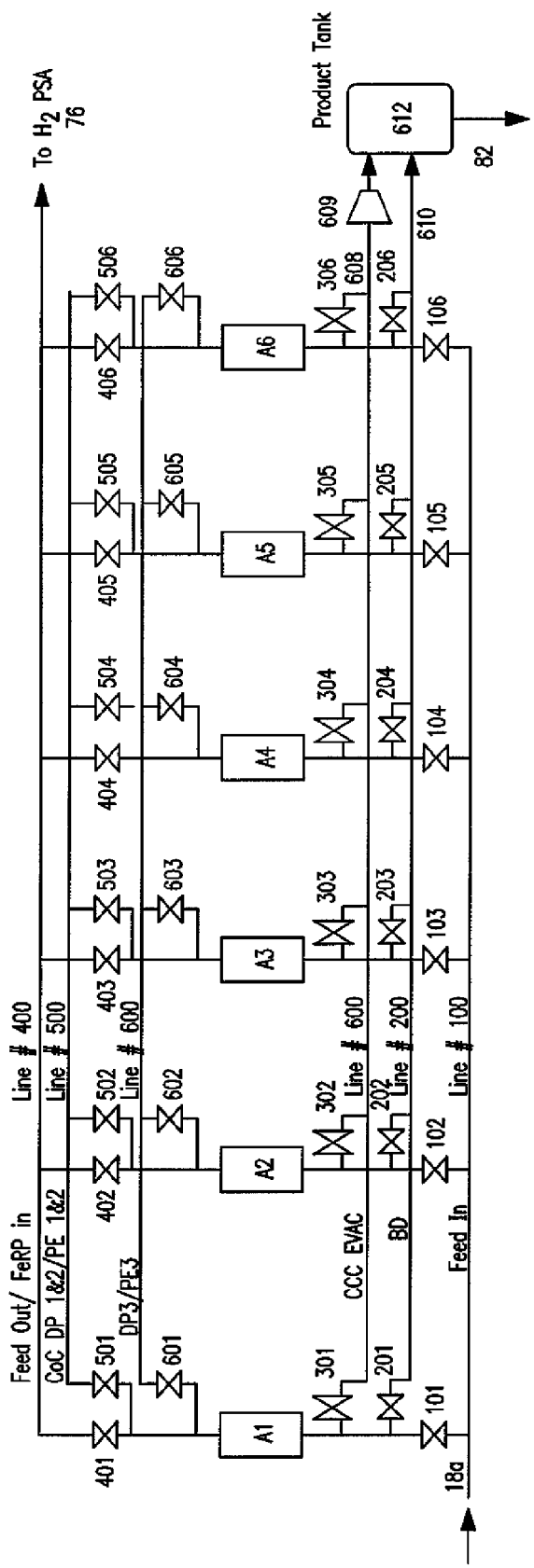
FIG. 3 is a schematic illustration of a vacuum pressure swing adsorption unit used in carrying the process illustration in FIG. 2.

With reference to FIG. 2, unit 80 can incorporate a process that includes ten steps and that is conducted in an apparatus, illustrated in FIG. 3, that includes six beds (A1 through A6) and a flow control network having valves: 101 through 106; 201-206; 301-306; 401-406; 501-506; and 601-609 that will subject each of the six beds to the ten steps. Each of the six beds (A1 through A6) contains a layer of alumina adsorbent to adsorb moisture and silica gel adsorbent to adsorb the carbon dioxide. The valve positions of the valves of FIG. 3 in apparatus 10 to accomplish the process of FIG. 2 are illustrated in FIG. 4. The valves shown in FIG. 4 that utilize valve positioners are employed to control flow for purposes known in the art. It should be appreciated that pressures and step durations shown are only for illustrative purposes.

The process steps generally include:

1. Feed Step: Stream 18a at high pressure (for example, about 375 psia) and produced by the water-gas shift reactor 14 is diverted to unit 80. The hydrogen-rich gas stream 76 is further processed alone or with remaining synthesis gas stream 18 in hydrogen pressure swing adsorption unit 20. After a predetermined time or after carbon dioxide breakthrough from the bed on the stream 18a, the feed step is terminated.

2. Co-Current (CoC) Depressurization 1 (DP1): The carbon dioxide vacuum pressure swing adsorption ("VPSA") bed, which has finished the feed step is now at high feed pressure (e.g., 100-500 psia), is depressurized to a medium pressure (e.g., 80-400 psia) in a direction the same (shown in FIG. 2) or opposite (not shown in FIG. 2) as the feed flow.

3. Co-Current (CoC) Depressurization 2 (DP2): The carbon dioxide VPSA bed, which is now at the medium pressure (e.g., 80-400 psia), is further depressurized to a lower pressure (e.g., 60-300 psia) in a direction the same as (shown in FIG. 2) or opposite (not shown in FIG. 2) as the feed flow.

4. Co-Current (CoC) Depressurization 3 (DP3): The carbon dioxide VPSA bed, which is now at the lower pressure (e.g., 60-300 psia), is further depressurized to a yet lower pressure (e.g., 50-200 psia) in a direction the same (shown in FIG. 2) or opposite (not shown in FIG. 2) as the feed flow.

5. Final Depressurization (DPf): The carbon dioxide VPSA bed, which is now at a pressure lower than at the start of step 4 (about 50-200 psia) is further depressurized to a pressure close to ambient (about 20 psia) in a direction the same as (not shown in FIG. 2) and/or the opposite (shown in FIG. 2) the feed flow to produce carbon dioxide product 610 shown in FIG. 8. This stream may constitute part of the crude carbon dioxide stream 82.

6. Evacuation: The carbon dioxide VPSA bed, which is now close to ambient pressure (about 20 psia), is evacuated to a predetermined low pressure, a subambient pressure (about 1-12 psia) in a direction the same as (not shown in FIG. 2) or opposite (shown in FIG. 2) to the feed flow by a vacuum pump 609. The gas from the bed under evacuation (stream 608 in FIG. 3) constitutes part of the crude carbon dioxide stream 82. Optionally, stream 608 can be further compressed using a blower (not shown) prior to passing to product tank 612.

7. Countercurrent (CcC) Pressure Equalization 3 (PE3): The evacuated bed is now pressure equalized to a pressure range of the gas produced in step 4 (DP3) (i.e. to about 50-200 psia) in a direction the same as (not shown in FIG. 2) or opposite (shown in FIG. 2) to the feed flow. This step increases carbon dioxide recovery by keeping the carbon dioxide from step 4 within the VPSA system. This minimizes carbon dioxide loss by eliminating the need to send the carbon dioxide to a waste stream.

8. Countercurrent (CcC) Pressure Equalization 2 (PE2): The bed pressure equalized in step 7 is now pressure equalized to a pressure range of the gas produced in step 3 (DP2) (i.e., to about 60-300 psia) in a direction the same as (not shown in FIG. 2) or opposite (shown in FIG. 2) to the feed flow. This step increases carbon dioxide recovery by keeping the carbon dioxide from step 3 within unit 80. This minimizes carbon dioxide loss by eliminating the need to send the carbon dioxide to a waste stream.

9. Countercurrent Pressure (CcC) Equalization 1 (PE1): The bed pressure equalized in step 8 is further pressure equalized to a pressure range of the gas produced by step 2 (DP1) (i.e. to about 80-400 psia) in a direction the same as (not shown in FIG. 2) or opposite (shown in FIG. 2) to the feed flow. This step further increases carbon dioxide recovery by keeping the carbon dioxide from step 2 within unit 80. This minimizes carbon dioxide loss by eliminating the need to send the carbon dioxide to a waste stream.

10. Repressurization (FeRP): The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1.

As further shown in FIG. 2, crude carbon dioxide stream 82 is formed of carbon dioxide from streams 608 (Step 7) and 610 (Step 6) and discharged from product tank 612. Crude carbon dioxide stream 82 is expected to have a carbon dioxide purity level of approximately 80 mole percent or greater. The ten-step process described is for one cycle for one bed in the carbon dioxide VPSA unit. The above ten steps are carried out in a cyclic manner such that feed-into and feed-effluent from step 1 are continuous. In addition, the evacuation step (number 6) is designed to be continuous. This ensures that the vacuum pump 609 operates continuously, and that there is no break in feed-into the unit 80 or to the hydrogen pressure swing adsorption unit 20. It is to be noted that the pressures and step durations are shown only for illustrative purposes and that as could be appreciated by those skilled in the art, other combinations of pressures and steps may be used. In unit 80 as described, the gas produced during the final depressurization is mixed with the evacuated gas from step number 6. Consequently, there is minimal or no hydrogen loss from the unit 80.

Crude carbon dioxide stream 82 contains between about 70 volume percent and about 98 volume percent carbon dioxide after unit 80. The remainder of crude carbon dioxide stream 82 is hydrogen, carbon monoxide, methane and nitrogen, if any. Crude carbon dioxide stream 82 is further purified in a sub-ambient distillation process that begins by compressing the crude carbon dioxide stream 84 in a compressor 700 to a pressure of between about 100 psia and about 1000 psia, more preferably between about 300 psia and about 800 psia. The optimum pressure will depend on the contraction of carbon dioxide. For example at a carbon dioxide concentration of about 95 percent in crude carbon dioxide stream 82, a pressure of between about 300 psia and about 500 psia will be preferred. At a concentration of about 80 percent, a pressure of between about 500 psia and about 800 psia will be preferred.

After compression, crude carbon dioxide stream 82 is then cooled in a cooler 702 to remove the heat of compression and thereby to condense moisture present within crude carbon dioxide stream 82. The resultant condensate is removed by introducing the carbon dioxide stream into a knock-out drum 704 and the disengaged moisture is discharged as a water stream 706. The crude carbon dioxide stream 82 is further dried within a drier unit 708, to be discussed in detail hereinafter and then introduced into a cold box 710.

Figure 5:
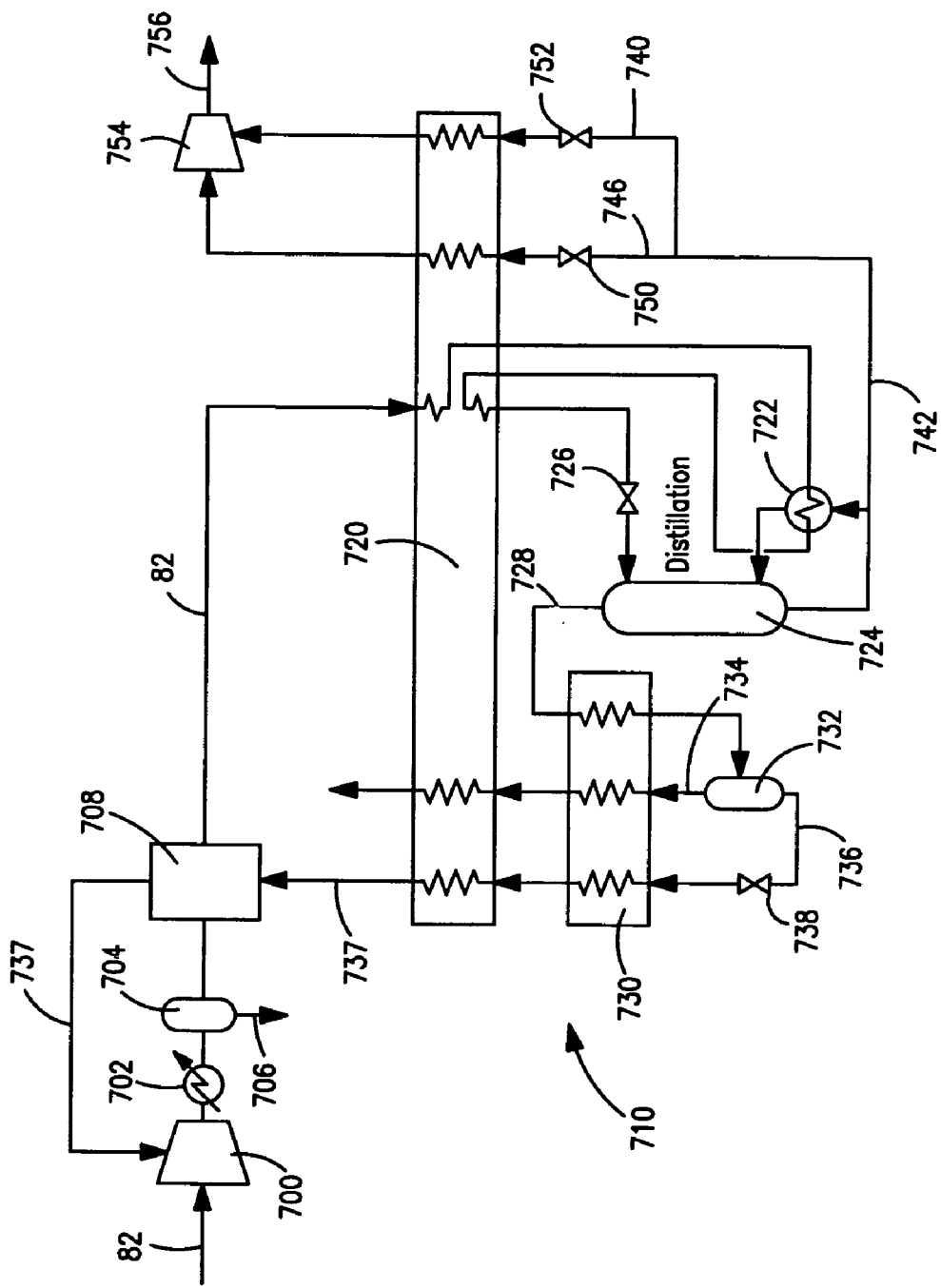
FIG. 5 is a schematic illustration of an apparatus used in carrying out a sub-ambient temperature distillation process used in the carbon dioxide recovery system illustrated in FIG. 1.

With additional reference to FIG. 5, within cold box 710, crude carbon dioxide stream 82 is introduced into a main heat exchanger 720 in which it is partly cooled and then introduced into a reboiler 722 that serves to produce boil up or initiate an ascending vapor phase within a stripping column 724. Crude carbon dioxide stream 82 is then again introduced into main heat exchanger 720 in which it is fully cooled to at least partially liquefy the crude carbon dioxide stream 82. The crude carbon dioxide stream 82 is then introduced into an expansion valve 726 into stripping column 724 to initiate a descending liquid phase within such column.

As well known in the art, stripping column 724 preferably has structured packing to contact the ascending vapor phase flowing up through the packing with a descending liquid film of the liquid phase. Other vapor-liquid contacting elements known in the art could be used such as sieve trays. As a result of the contact, the descending liquid phase becomes evermore rich in carbon dioxide, the less volatile component and the ascending vapor phase becomes evermore rich in impurities that have a higher volatility than the carbon dioxide. Crude carbon dioxide stream 82 having been derived from synthesis gas stream 18 contains carbon dioxide and impurities such as hydrogen, carbon monoxide and methane. Since all of such impurities are more volatile than the carbon dioxide, they will be stripped from the descending liquid to produce a carbon dioxide-lean column overhead and a carbon dioxide-rich, liquid column bottoms.

A column overhead stream 728 can be extracted from stripping column 724 that is composed of the carbon dioxide-lean column overhead and further refined. This is accomplished by introducing column overhead stream 728 into an auxiliary heat exchanger 730 so that the carbon dioxide overhead stream 728 is at least partially liquefied. The carbon dioxide overhead stream 730 is then introduced into a phase separator 732 to produce a carbon dioxide-depleted vapor stream 734 and a carbon dioxide-rich liquid stream 736. Carbon dioxide-rich liquid stream 736 is expanded within an expansion valve 738 and then passed together with the carbon dioxide-depleted vapor stream 734 into auxiliary heat exchanger 730. Expansion valve 738 provides refrigeration for the partial liquefaction of carbon dioxide overhead stream 728. Carbon dioxide-rich liquid stream 736 is then vaporized within main heat exchanger 720 to form carbon dioxide-rich vapor stream 737 and carbon dioxide-depleted vapor stream 734 further warms within main heat exchanger 720.

Carbon dioxide-rich vapor stream 737 is used to regenerate dryer unit 708 and is thereafter, recycled to an appropriate stage of compression of compressor 700 being that such stream can contain about 98 percent by volume carbon dioxide. In this regard, carbon dioxide-rich vapor stream 737 can have a pressure of between about 50 psia and about 150 psia and can contain between about 10 percent and about 15 percent of the carbon dioxide within crude carbon dioxide stream 82. The recycling of such stream is calculated to be able to increase carbon dioxide recovery from the crude carbon dioxide stream to greater than about 99 percent. The carbon dioxide-depleted vapor stream 734 is preferably recycled back to unit 80 since its carbon dioxide concentration is greater than the synthesis gas stream 18 and can contain between about 20 mol percent and about 30 mol percent carbon dioxide.

A carbon dioxide product stream 742 as a liquid can be extracted from stripping column 724 that is composed of carbon dioxide-rich liquid column bottoms. In order to generate refrigeration, the carbon dioxide product stream 742 can be split into subsidiary streams 746 and 748 and subsidiary stream 746 is expanded to lower pressure by the use of expansion valve 750 and subsidiary stream 748 is expanded to a higher pressure with the use of expansion valve 752. Both subsidiary streams 746 and 748 are then vaporized in main heat exchanger 720. The resultant lower pressure subsidiary stream 746 is introduced into the inlet of product compressor 754. The higher pressure subsidiary stream 748 is introduced into an intermediate stage of product compressor 754. As could be appreciated, carbon dioxide product stream 742 could be expanded at a single pressure. However, as could be appreciated, this would not be as energy efficient as the illustrated embodiment.

The resultant compressed product stream 756 can be introduced into a pipeline for transporting it to oil field for enhanced oil recovery process in which compressed product stream is introduced into an injection well to drive oil within the oil field to producing wells. Alternatively, carbon dioxide can be sent to a sequestration site for permanent storage of the carbon dioxide. Such processes typically require carbon dioxide at a pressure of between about 1200 psia and about 2500 psia. In this regard, typically a synthesis gas stream 18 has a carbon dioxide content of between about 12 percent and about 25 percent. The invention as discussed above is capable of being operated such that the crude carbon dioxide stream has a carbon dioxide content of between about 70 percent and about 98 percent and oxygen content of between 0 and 5000 ppm. Further, particularly in the case of enhanced oil recovery, the carbon dioxide product should have a purity of between about 98 and 99.9999 percent carbon dioxide and below 100 ppm oxygen, preferably below 10 ppm oxygen.

Figure 6:
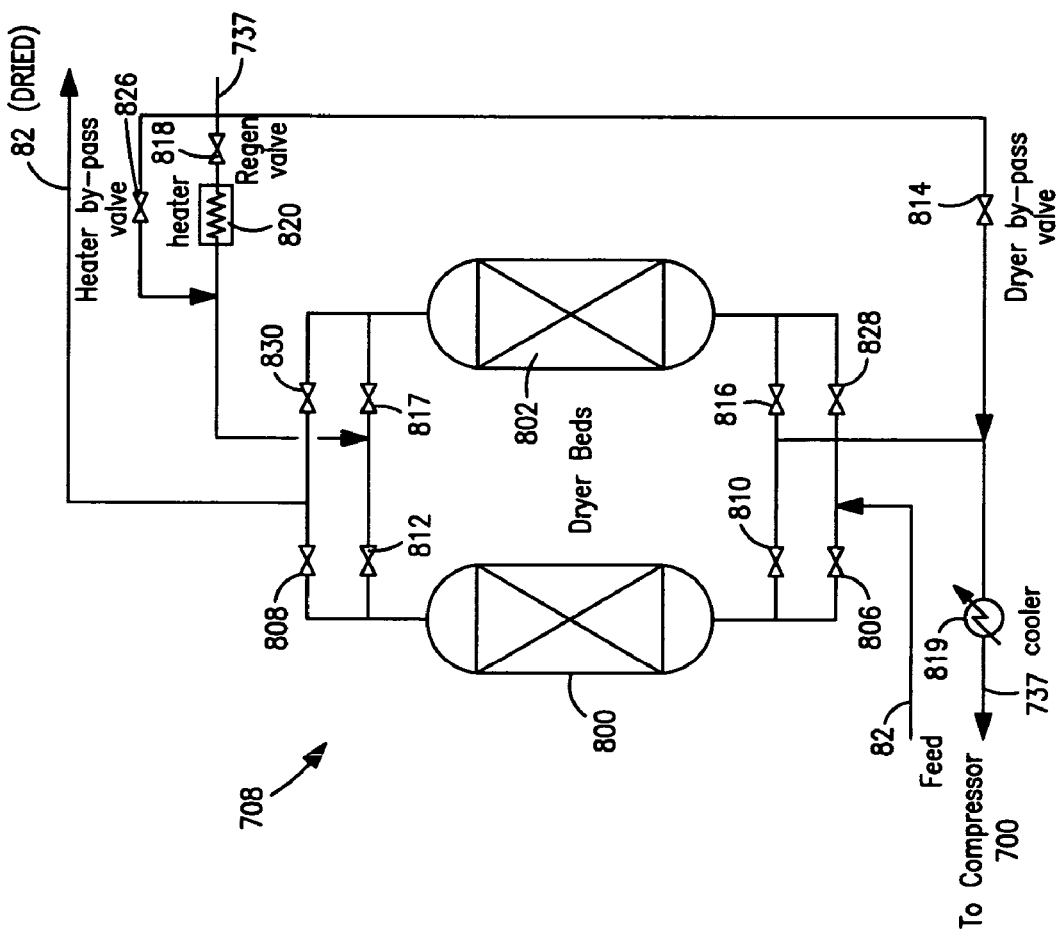
FIG. 6 is a schematic illustration of a dryer unit used in connection with the sub-ambient temperature distillation process illustrated in FIG. 5.

With reference to FIG. 6, an embodiment of dryer unit 708 is illustrated. Dryer unit 708 has two beds 800 and 802 containing an alumina adsorbent. When bed 800 is on-line adsorbing moisture from crude carbon dioxide stream 82, valves 806 and 808 are open. Valves 810 and 812 are closed. At such time, bed 802 is being regenerated, for such purposes, bed 802 is subject to depressurization, heating to desorb the previously adsorbed moisture, cooling and then repressurization to bring bed 802 back on line and adsorbing.

During depressurization, dryer by-pass valve 814 is set in the open position and carbon dioxide-rich vapor stream 737 used for the regeneration by-passes bed 802 and flows to compressor 700 after having been cooled in cooler 819. Valve 816 is set in an open position allowing bed 802 to depressurize. After bed 802 is depressurized, valve 814 closes and valves 816, 817 and 818 open allowing the carbon dioxide-rich vapor stream 737 to pass through a heater 820 to heat the carbon dioxide-rich vapor stream 737 to a temperature of between about 300° F. to 600° F., pass through bed 802 and be discharged to compressor 700 after having passed through cooler 819. This causes moisture to desorb from the adsorbent within bed 802. Bed 802 is then cooled by opening heater by-pass valve 826 and closing regeneration valve 818. After cooling, heater by-pass valve 826 and valves 816 and 817 are closed and dryer by-pass valve 814 opens. At this time, valve 828 is cracked open allowing some of the crude carbon dioxide contained in crude carbon dioxide stream 82 to enter bed 802 for repressurization purposes. Once repressurized, valves 806 and 808 are set in a closed position and valves 828 and 830 are set in open positions allowing bed 802 to be brought back on line and bed 800 to be regenerated in the same manner as bed 802 and with the use of valves 810 and 812. The process is continuous to allow for continuous flow.

It is to be noted that while the above sub-ambient temperature distillation process is preferred, there are other types of distillation processes, known in the art that are possible. For example, the use of successive columns to further refine column overhead stream 728. Also, although dryer unit 708 is preferred, other types of dryer units are possible within the scope of the present invention as are well known in the art. In fact known reversing heat exchangers could be used, albeit at greater expense and lower efficiency.

Figure 7:
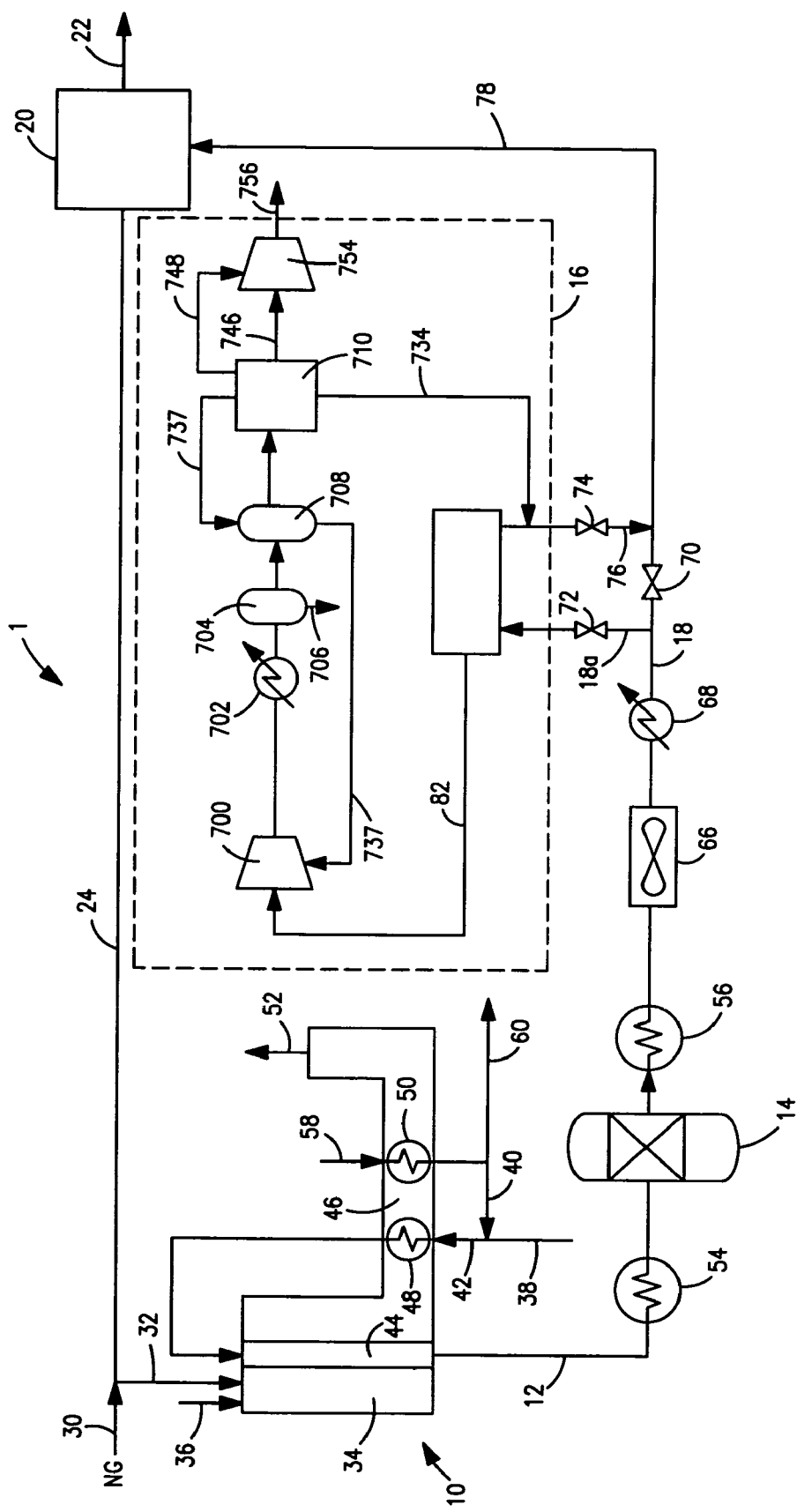
FIG. 7 is an alternative embodiment of FIG. 1.

With reference to FIG. 7, an alternative embodiment of FIG. 1 is illustrated in which the carbon dioxide-depleted vapor stream 734 is combined with the hydrogen-rich synthesis gas stream 76 to form a hydrogen feed stream 78.

Figure 8:
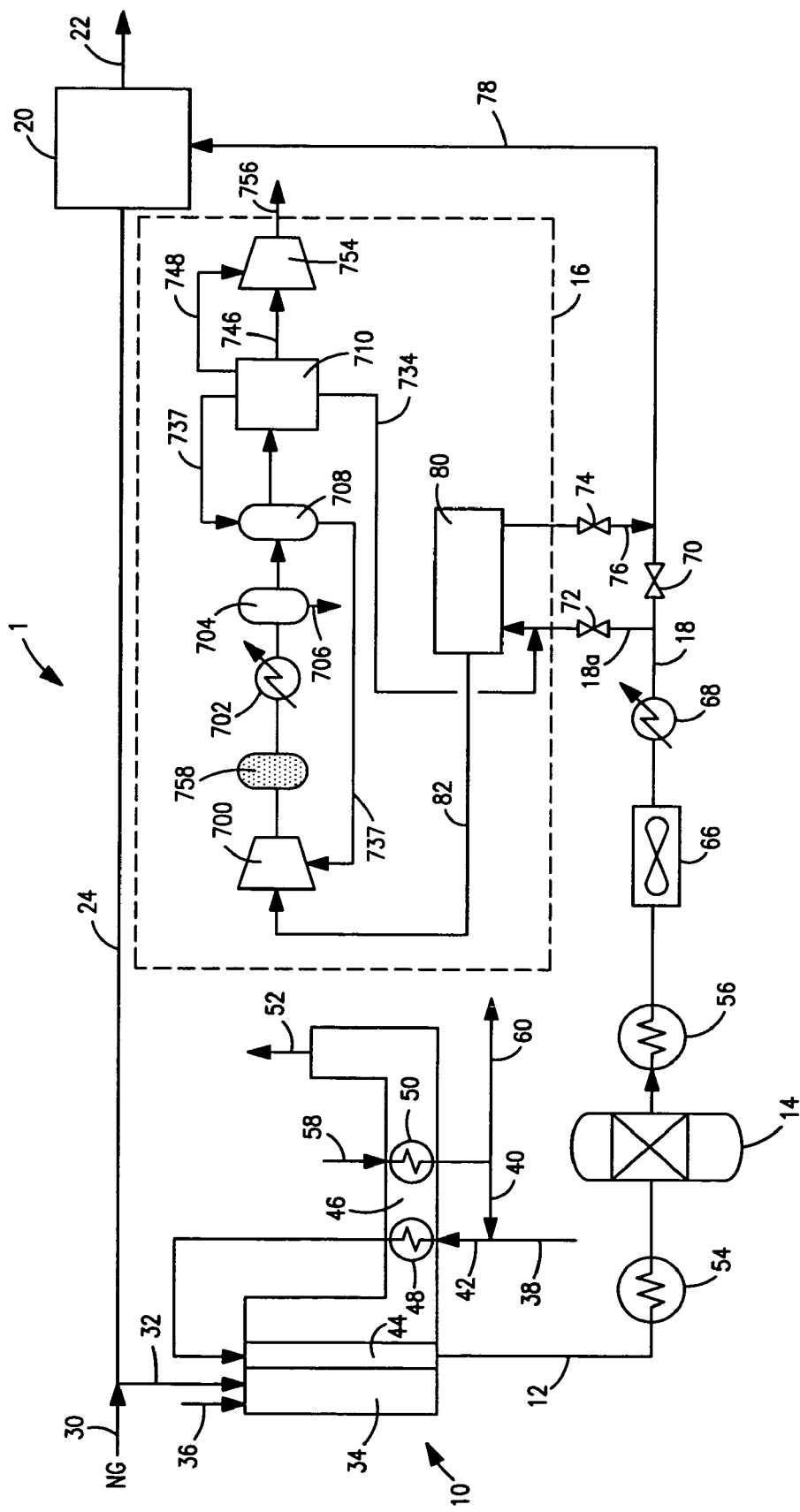
FIG. 8 is an alternative embodiment of FIG. 1.

With reference to FIG. 8, an alternative embodiment of FIG. 1 is shown in which oxygen within crude carbon dioxide stream 84 is removed by a deoxo unit 758 of the type that contains a known catalytic bed. Although deoxo unit 758 is illustrated as being located directly downstream of compressor 700, it could also be located upstream of compressor 700. The deoxo unit 758 can also be located downstream of cold box 710 to remove oxygen from carbon dioxide-depleted vapor stream 734. Yet another alternative is to place the deoxo unit 758 upstream of hydrogen PSA unit 20 to remove oxygen from hydrogen-rich stream 78. The vacuum pressure swing adsorption unit 80 during an evacuation step could introduce oxygen into the system that could pose safety and purity concerns. The deoxo unit 758 alleviates such concerns by removing such oxygen.

Figure 9:
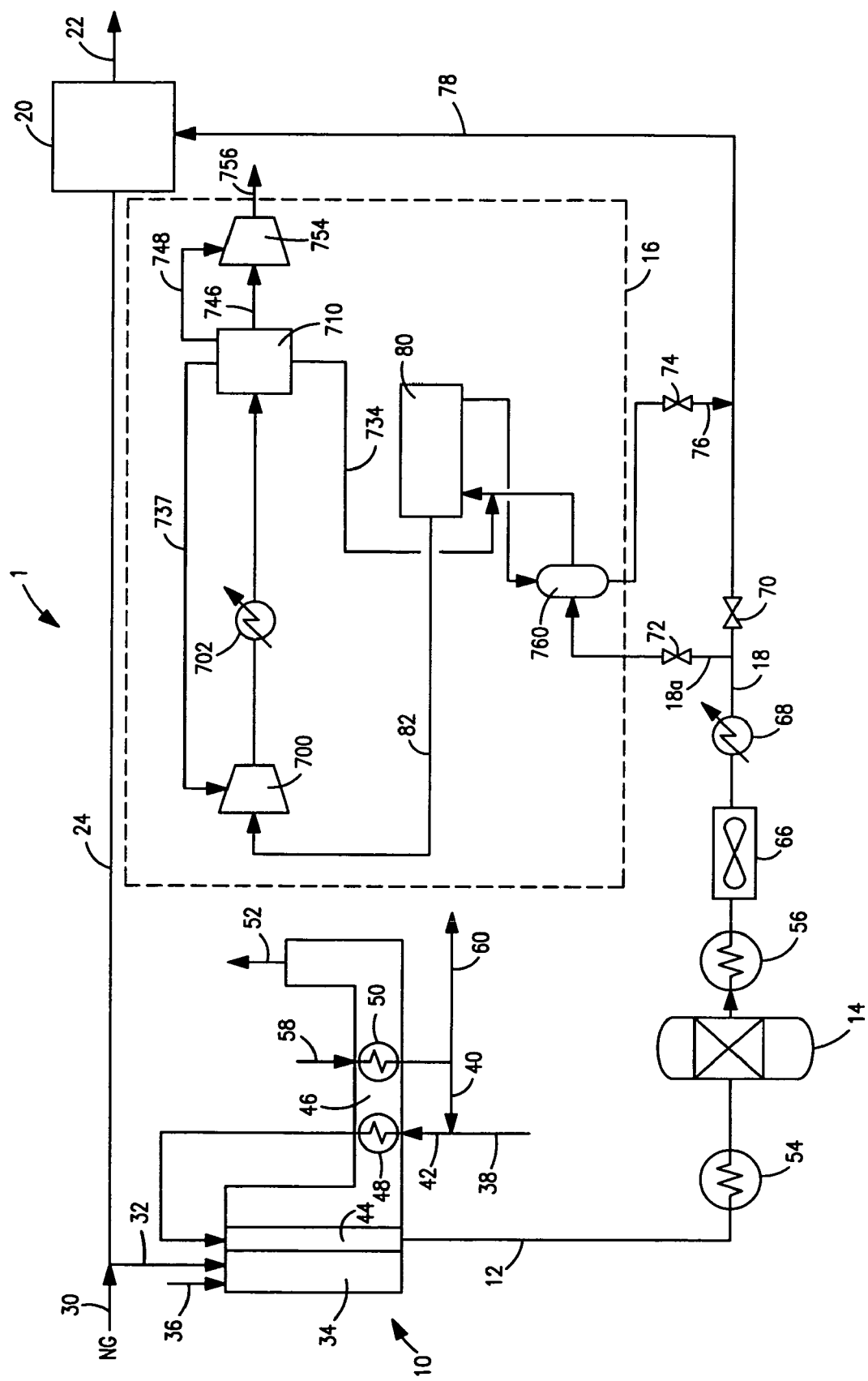
FIG. 9 is an alternative embodiment of FIG. 1.
Figure 10:
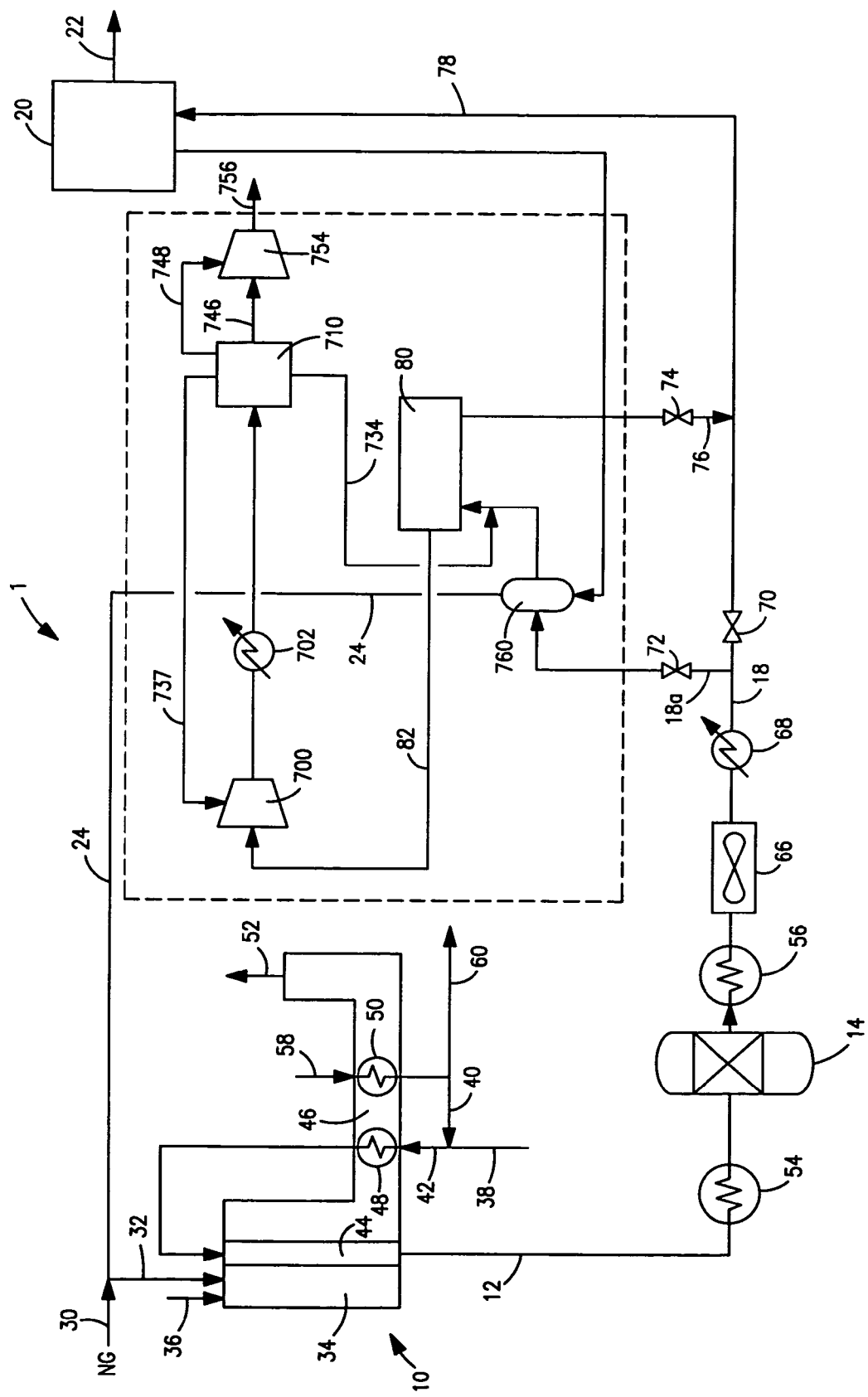
FIG. 10 is an alternative embodiment of FIG. 1.
Figure 11:
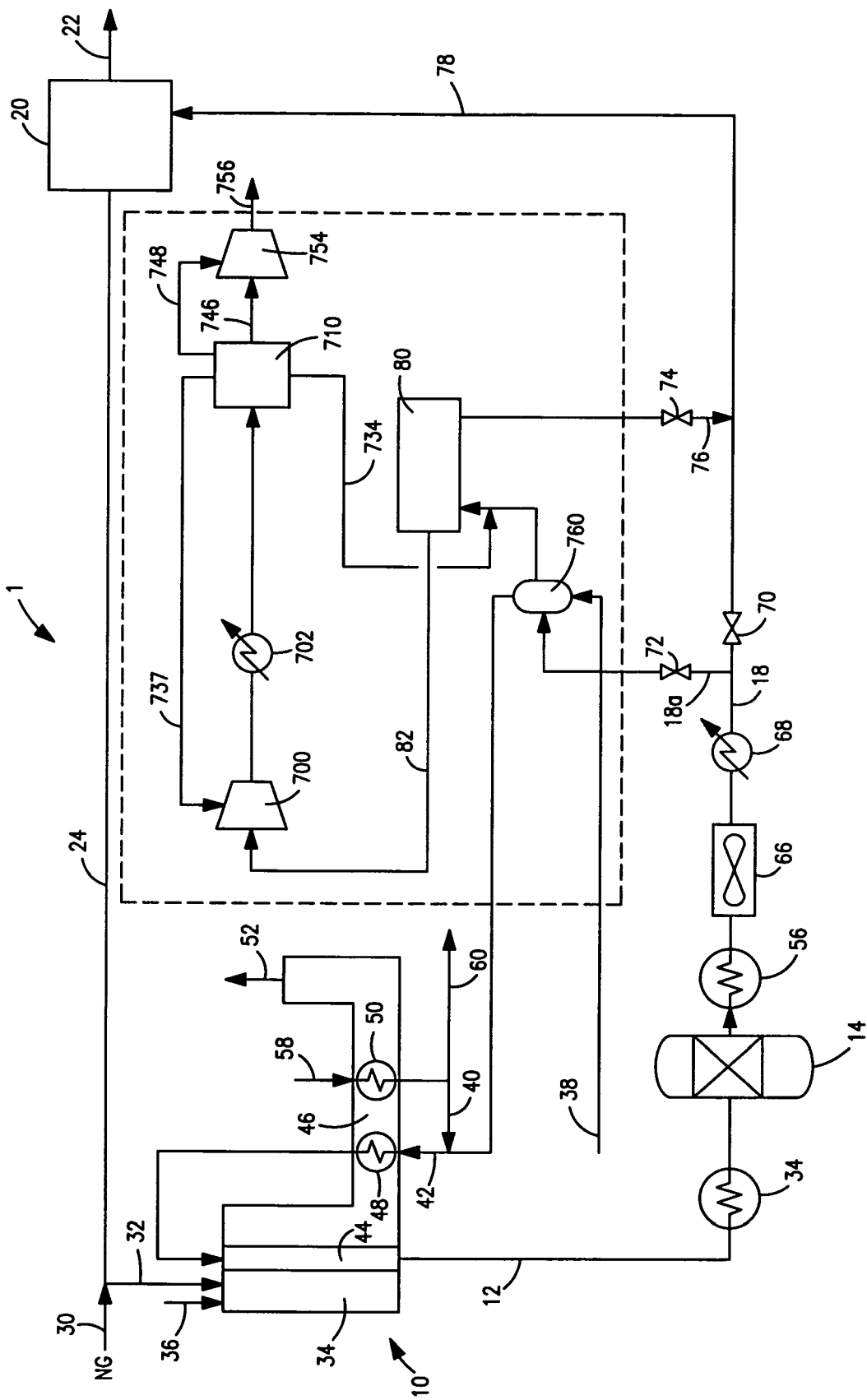
FIG. 11 is an alternative embodiment of FIG. 1.
Figure 12:
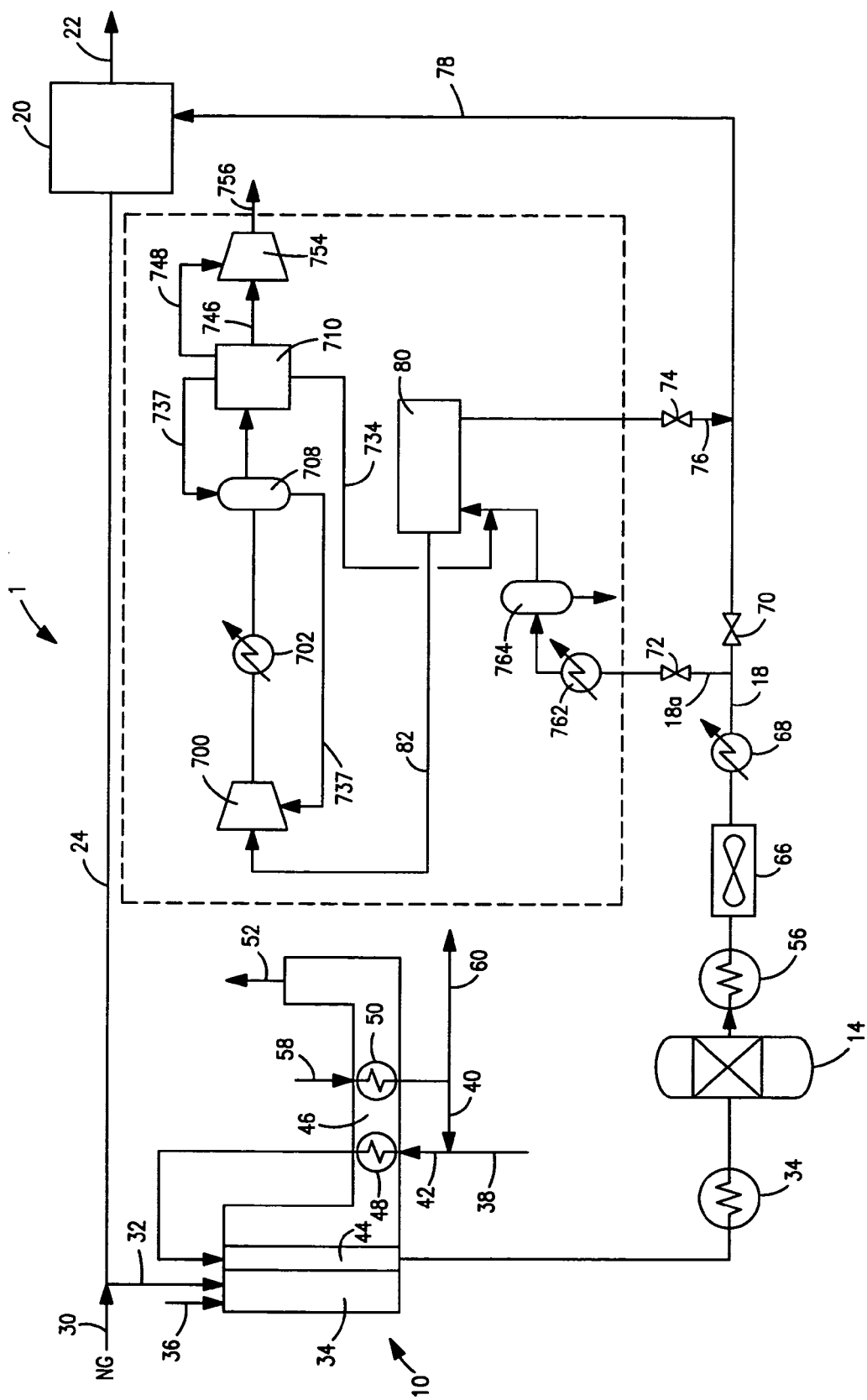
FIG. 12 is an alternative embodiment of FIG. 1.

With reference to FIGS. 9, 10, and 11 a dryer 760 of the same type as dryer unit 708 can be positioned upstream of the vacuum pressure swing adsorption unit 80. In the embodiments illustrated in these figures, all or part of the synthesis gas stream 18 is used as the stream to be dried in place of crude carbon dioxide stream 82. In FIG. 9, the regeneration stream is hydrogen-rich gas stream 76. In FIG. 10, the regeneration stream is the tail gas stream 24 and in FIG. 11, the regeneration stream is the hydrocarbon containing stream 38 to be reacted within steam methane reformer 11. It is to be recalled that the regeneration stream in case of the dryer unit 708 is carbon dioxide-rich vapor stream 737. As shown in FIG. 12, a yet further option is to cool stream 18*a* in a cooling unit 762 to condense its moisture content. Stream 18*a* is then introduced into a knockout drum 764 to disengage the condensate from the synthesis gas stream. Dryer unit 708 is retained in this embodiment. In the embodiments shown in FIGS. 9 through 11 complete removal of moisture prevents any possibility of carbon dioxide and water condensate to form corrosive carbonic acid and thus allows less expensive material to be used in the equipment such as crude carbon dioxide compressor, vacuum pressure swing unit components (such as vessels, valves and carbon dioxide blower) and piping connecting these units. Water knock-out drums normally used between stages of the multi-stage crude carbon dioxide compressor are also eliminated. Embodiment shown in FIG. 12 also offers some of the same benefits mentioned above by removing sufficient moisture so as to maintain the crude carbon dioxide stream 82 above the dew point to prevent any condensation.

EXAMPLE 1

The following calculated example describes the details of various streams. The embodiment shown in FIG. 2 was used to report the results shown in Table 1. The values are based on the experimental data for the carbon dioxide vacuum pressure swing adsorption unit 80 and hydrogen pressure swing adsorption unit 20.

The overall carbon dioxide recovery in the above example was about 85 percent based on the amount of carbon dioxide in the synthesis gas stream 18. If the carbon dioxide-depleted vapor stream 734 is recycled and mixed with the synthesis gas stream 18 according to embodiment shown in FIG. 1, then the overall carbon dioxide recovery could be improved to about 95 percent.

TABLE 1

| | Stream | | | | | |
|---|---|---|---|---|---|---|
| | 18 | 82 | 82 after dryer unit 708 | 734 | 737 | 76 |
| Flow, MMscfd | 75 | 14.2 | 15.6 | 3.9 | 1.6 | 64.7 |
| Pressure, psia | 380 | 18 | 700 | 447 | 135 | 375 |
| Temperature °F. | 100 | 100 | 95 | 55 | 55 | 97 |
| Composition (mol fraction) | | | | | | |
| $H_2$ | 0.7570 | 0.1199 | 0.1098 | 0.4384 | 0.0052 | 0.8777 |
| $CO_2$ | 0.1605 | 0.7925 | 0.8202 | 0.2938 | 0.9640 | 0.0297 |
| CO | 0.0249 | 0.0184 | 0.0172 | 0.0673 | 0.0041 | 0.0289 |
| $CH_4$ | 0.0539 | 0.0546 | 0.0525 | 0.1995 | 0.0267 | 0.0625 |
| $N_2$ | 0.0010 | 0.0003 | 0.0003 | 0.0011 | 0.0001 | 0.0012 |
| $H_2O$ | 0.0027 | 0.0143 | 0.0000 | 0.0000 | 0.0000 | 0.0000 |

| | Stream | | | | |
|---|---|---|---|---|---|
| | 22 | 24 | *746 | *748 | 756 |
| Flow, MMscfd | 50.2 | 14.4 | 5.1 | 5.1 | 10.2 |
| Pressure, psia | 370 | 20 | 176 | 330 | 2000 |

TABLE 1-continued

| | | | | | |
|---|---|---|---|---|---|
| Temperature °F. | 97 | 95 | 58 | 58 | 100 |
| Composition (mol fraction) | | | | | |
| $H_2$ | 0.99996 | 0.4522 | 0 | 0 | 0 |
| $CO_2$ | 0 | 0.1333 | 0.9999 | 0.9999 | 0.9999 |
| CO | 0.68 ppm | 0.1294 | 0 | 0 | 0 |
| $CH_4$ | 0.05 ppm | 0.2799 | 0.0001 | 0.0001 | 0.0001 |
| $N_2$ | 0.00004 | 0.0052 | 0 | 0 | 0 |

| Stream | | | | | |
|---|---|---|---|---|---|
| | 18 | 82 | 82 after dryer unit 708 | 734 | 737 | 76 |
| $H_2O$ | 0 | 0.0000 | 0 | 0 | 0 | |

*After discharge from warm end of main heat exchanger 720.

While the present invention has been described with respect to preferred embodiments, as will occur to those skilled in the art, numerous changes, additions and omissions can be made without departing from the spirit and scope of the present invention as set forth in the presently pending claims.

We claim:

1. A method of producing a carbon dioxide product from a synthesis gas stream formed within a hydrogen plant having a synthesis gas reactor, a water-gas shift reactor located downstream of the synthesis gas reactor to form the synthesis gas stream and a hydrogen pressure swing adsorption unit to produce a hydrogen product from hydrogen contained in the synthesis gas stream, said method comprising:

recovering carbon dioxide from at least part of the synthesis gas stream, between the water-gas shift reactor and the hydrogen pressure swing adsorption unit, by separating the carbon dioxide from the at least part of the synthesis gas stream in a vacuum pressure swing adsorption process such that a hydrogen-rich gas stream and a crude carbon dioxide stream having a concentration of the carbon dioxide of between about 70 volume percent and about 98 volume percent are produced and purifying the crude carbon dioxide stream by introducing the crude carbon dioxide stream as a sole feed to a sub-ambient temperature distillation process thereby to produce the carbon dioxide product as a vapor;

the sub-ambient temperature distillation process being conducted by compressing and drying the crude carbon dioxide stream, cooling the crude carbon dioxide stream to the sub-ambient temperature, stripping the crude carbon dioxide stream within a stripping column to produce a liquid carbon dioxide containing column bottoms and a tower overhead, expanding a liquid stream, composed of the liquid carbon dioxide containing column bottoms, at least at one pressure to produce refrigeration, vaporizing the liquid stream to produce at least one carbon dioxide product stream as the carbon dioxide product and such that the refrigeration produced by expanding the liquid stream is imparted to the sub-ambient temperature distillation process;

forming a hydrogen synthesis gas feed stream, at least in part, from the hydrogen-rich gas stream and introducing the hydrogen synthesis gas feed stream into the hydrogen pressure swing adsorption unit, thereby to produce the hydrogen product.

2. The method of claim 1, wherein:

the crude carbon dioxide stream is dried in a drying unit having an adsorbent subjected to a temperature swing adsorption process wherein moisture is desorbed from the adsorbent with the use of a heated regeneration gas stream;

the sub-ambient distillation process includes further refining a column overhead stream composed of column overhead to produce a carbon dioxide-rich vapor stream and a carbon dioxide-depleted vapor stream;

the carbon dioxide-rich vapor stream is used as the regeneration gas stream and is thereafter recycled back to a compressor used in compressing the crude carbon dioxide stream; and the carbon dioxide-depleted vapor stream is recycled back to and fed, along with the synthesis gas stream to the vacuum pressure swing adsorption process.

3. The method of claim 1, wherein:

the crude carbon dioxide stream is dried in a drying unit having an adsorbent subjected to a temperature swing adsorption process wherein moisture is desorbed from the adsorbent with the use of a heated regeneration gas stream;

the sub-ambient distillation process includes further refining a column overhead stream composed of column overhead to produce a carbon dioxide-rich vapor stream and a carbon dioxide-depleted vapor stream;

the carbon dioxide-rich vapor stream is used as the regeneration gas stream and is thereafter recycled back to a compressor used in compressing the crude carbon dioxide stream; and the carbon dioxide-depleted vapor stream is combined with the hydrogen-rich synthesis gas stream to form the hydrogen synthesis gas feed stream.

4. The method of claim 2 or claim 3, further comprising catalytically removing oxygen from the crude carbon dioxide stream either before or after the compression of the crude carbon dioxide stream.

5. The method of claim 1, wherein:

the sub-ambient distillation process includes further refining a column overhead stream composed of column overhead to produce a carbon dioxide-rich vapor stream and a carbon dioxide-depleted vapor stream;

the carbon dioxide-rich vapor stream is recycled back to a compressor used in compressing the crude carbon dioxide stream; and the carbon dioxide-depleted vapor stream is recycled back to and fed, along with the at least part of synthesis gas stream to the vacuum pressure swing adsorption process.

6. The method of claim 5, wherein:

the at least part of the synthesis gas stream, upstream of the vacuum pressure swing adsorption process is dried in a drying unit having an adsorbent subjected to a temperature swing adsorption process wherein moisture is desorbed from the adsorbent with the use of a heated regeneration gas stream; and the hydrogen-rich gas stream is heated and used to form the heated regeneration gas stream.

7. The method of claim 5, wherein:

the synthesis gas reactor is a steam methane reformer; and the at least part of the synthesis gas stream, upstream of the vacuum pressure swing adsorption process is dried in a drying unit having an adsorbent subjected to a temperature swing adsorption process wherein moisture is desorbed from the adsorbent with the use of a heated regeneration gas stream; and the further heated regeneration gas stream is made up of a tail gas stream produced by the hydrogen pressure swing adsorption process that is thereafter, utilized as part of a fuel for burners located within a radiant heat exchange section of the steam methane reformer.

8. The method of claim 5, wherein:

the synthesis gas reactor is a steam methane reformer; and the at least part of the synthesis gas stream, upstream of the vacuum pressure swing adsorption process is dried in a drying unit having an adsorbent subjected to a temperature swing adsorption process wherein moisture is desorbed from the adsorbent with the use of a heated regeneration gas stream; and the further heated regeneration gas stream is made up of the hydrocarbon containing feed stream that is thereafter, reacted within catalyst filled reaction tubes located within a radiant heat exchange section of the steam methane reformer.

9. The method of claim 2 or claim 3, wherein:

moisture is removed from the at least part of the synthesis gas stream prior to the vacuum pressure swing adsorption process and from the crude synthesis gas stream within the sub-ambient temperature distillation process; and part of the moisture is removed from the at least part of the synthesis gas stream by cooling the at least part of the synthesis gas stream to condense the part of the moisture contained therewithin and removing resultant condensate from the at least part of the synthesis gas stream in a knock-out drum.

10. The method of claim 1, further comprising compressing the carbon dioxide product stream.

11. The method of claim 10, further comprising:

the synthesis gas stream having a carbon dioxide content of between about 12 percent and about 25 percent;

the crude carbon dioxide stream has an oxygen content of between 0 and 5000 ppm;

the carbon dioxide product stream having a purity of between about 98 and 99.9999 percent carbon dioxide and below 100 ppm oxygen;

the carbon dioxide product stream is compressed to a pressure of between about 1200 psia and about 2500 psia; and the carbon dioxide product stream is introduced into an enhanced oil recovery process or introduced into carbon dioxide storage site for sequestration.

* * * * *